United States Patent
Cooper et al.

(10) Patent No.: US 9,411,672 B1
(45) Date of Patent: *Aug. 9, 2016

(54) TWO STAGE LOG NORMALIZATION

(71) Applicant: International Business Machines Corporation, Armonk, NY (US)

(72) Inventors: Phillip A. J. Cooper, Southport (AU); Jevon J. C. Hill, Southport (AU); Fiona L. Lam, Pacific Pines (AU); Kalvinder P. Singh, Miami (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,732

(22) Filed: Apr. 5, 2016

Related U.S. Application Data

(63) Continuation of application No. 14/802,622, filed on Jul. 17, 2015.

(51) Int. Cl.
  *G06F 11/00* (2006.01)
  *G06F 11/07* (2006.01)
(52) U.S. Cl.
  CPC .......... *G06F 11/0781* (2013.01); *G06F 11/079* (2013.01)
(58) Field of Classification Search
  CPC ............ G06F 11/0769; G06F 11/0775; G06F 11/0781; G06F 11/079; G06F 11/1402; G06F 11/1476; G06F 11/3476; G06F 11/3668; G06F 11/3688; G06F 11/3692
  See application file for complete search history.

(56) References Cited

U.S. PATENT DOCUMENTS

| | | | |
|---|---|---|---|
| 7,475,135 B2 * | 1/2009 | Bantz | G06F 11/0748 709/224 |
| 8,112,667 B2 * | 2/2012 | Belluomini | G06F 11/079 707/603 |
| 8,209,567 B2 | 6/2012 | Cohen et al. | |
| 8,230,259 B2 | 7/2012 | Fernandess et al. | |
| 8,495,429 B2 | 7/2013 | Fu et al. | |
| 8,533,193 B2 | 9/2013 | Hubbard | |
| 8,538,897 B2 | 9/2013 | Han et al. | |
| 8,806,550 B1 | 8/2014 | Chan | |
| 9,069,737 B1 * | 6/2015 | Kimotho | G06F 11/1484 |
| 2014/0053021 A1 * | 2/2014 | Schwartz | G06F 9/45512 714/15 |

(Continued)

OTHER PUBLICATIONS

U.S. Appl. No. 14/802,622, filed Jul. 17, 2015,—This Document is not Provided Because it is Readily Available to the Examiner.

(Continued)

*Primary Examiner* — Joseph Kudirka
(74) *Attorney, Agent, or Firm* — Maeve Carpenter

(57) ABSTRACT

An approach for two stage log normalization is provided. The approach retrieves a message format and a plurality of parameters from one or more log files. The approach determines a classification for one or more first sequence files, wherein the one or more first sequence files includes the message format from the one or more log files. The approach determines a classification of error for the one or more first sequence files. The approach determines whether there is a high confidence in the classification of error for the one or more first sequence files. The approach determines whether there is an improvement in confidence in the classification of error from one or more second sequence files, wherein the one or more second sequence files includes the message format and the plurality of parameters from the one or more log files.

1 Claim, 4 Drawing Sheets

(56) References Cited

U.S. PATENT DOCUMENTS

2015/0254555 A1 9/2015 Williams, Jr. et al.
2015/0347212 A1* 12/2015 Bartley .............. G06F 11/079
                                                          714/37

OTHER PUBLICATIONS

List of IBM Patents or Patent Applications Treated as Related (Appendix P), filed Apr. 19, 2016.

"DSM Configuration Guide", IBM Security QRadar, Version 7.1.x and 7.2.x, Copyright IBM Corp. 2005, printed on Mar. 15, 2015, 731 pages.

Fronza et al., "Failure Prediction Based on Log Files Using Random Indexing and Support Vector Machines", The Journal of Systems and Software, 2012, May 18, 2011, 10 pages, <http://www.inf.unibz.it/~gsucci/publications/full%20text/full%20text/FailorPredictionBasedOnLogFilesl.pdf>.

Hawthorn, "Openstack Elastic-Recheck: Powered by the Elk Stack", Elastic, May 29, 2014, 7 pages, <http://www.elasticsearch.org/blog/openstack-elastic-recheck-powered-elk-stack/>.

Li, "Automatic Log Analysis Using Machine Learning, Awesome Automatic Log Analysis Version 2.0", Nov. 2013, 40 pages, <http://uu.diva-portal.org/smash/get/diva2:667650/FULLTEXT01.pdf>.

"Log Normalization for Different Formats", Rsyslog, printed on Mar. 15, 2015, 8 pages, <http://www.rsyslog.com/log-normalization-for-different-formats/>.

"Logm, Mining Free Text Console Logs", Google Project Hosting, printed on Mar. 15, 2015, 2 pages, <https://code.google.com/p/logm/>.

Reidemeister et al., "Diagnosis of Recurrent Faults Using Log Files", Proceedings of the 2009 conference of the Center for Advanced Studies on Collaborative Research (CASCON '09), Nov. 2009, pp. 12-23, <http://dl.acm.org/citation.cfm?id=1723031>.

Xu et al., "Detecting Large-Scale System Problems by Mining Console Logs", Proceedings of the 22nd ACM Symposium on Operating Systems Principles (SOSP' 09), Oct. 2009, 16 pages, <http://www.cs.berkeley.edu/~jordan/papers/xu-etal-icml110.pdf>.

Xu et al., "Online System Problem Detection by Mining Patterns of Console Logs", IEEE International Conference on Data Mining (ICDM' 09), Dec. 2009, 10 pages, <http://www.cs.berkeley.edu/~xuw/files/sosp09.pdf>.

* cited by examiner

TWO STAGE LOG NORMALIZATION

BACKGROUND OF THE INVENTION

The present invention relates generally to problem diagnosis in software systems, and more particularly to two stage log normalization for automatic noise removal and improved machine learning.

Log files may be a rich source of information for problem diagnosis in software systems. Log files may reveal problems depending on a pattern of one or more messages being shown, content of the one or more messages, or a combination of both.

Machine learning may speed up the process of problem diagnosis. Machine learning typically leverages training data to be able to recognize and categorize important information within the log files.

SUMMARY

Aspects of an embodiment of the present invention disclose a method, a computer system, and a computer program product for two stage log normalization for automatic noise removal and improved machine learning, in accordance with an embodiment of the present invention. The method includes retrieving, by one or more computer processors, a message format and a plurality of parameters from one or more log files. The method includes determining, by one or more computer processors, a classification for one or more first sequence files, wherein the one or more first sequence files includes the message format from the one or more log files, wherein determining includes creating the one or more first sequence files, wherein creating includes retrieving a corresponding unique message ID for each of the one or more log files, and utilizing conventional machine learning processes to train data for the classification of the one or more first sequence files. The method includes determining, by one or more computer processors, a classification of error for the one or more first sequence files, wherein determining includes determining one or more similarities between the one or more first sequence files and a plurality of existing trained data. The method includes determining, by one or more computer processors, whether there is a high confidence in the classification of error for the one or more first sequence files, wherein determining includes determining a level of similarity between the classification of error for the one or more first sequence files and a plurality of existing trained data. Responsive to a determination that the level of similarity between the classification of error for the one or more first sequence files and the plurality of existing trained data is high, the method includes determining, by one or more computer processors, that there is a high confidence in the classification of error. Responsive to a determination that the level of similarity between the classification of error for the one or more first sequence files and the plurality of existing trained data is low, the method includes determining, by one or more computer processors, that there is not a high confidence in the classification of error. Responsive to a determination that there is not a high confidence in the classification of error for the one or more first sequence files, the method includes determining, by one or more computer processors, whether there is an improvement in confidence in the classification of error from one or more second sequence files, wherein the one or more second sequence files includes the message format and the plurality of parameters from the one or more log files, wherein determining includes creating the one or more second sequence files, wherein creating includes retrieving a corresponding unique parameter ID for each of the one or more log files and sequencing the unique message ID for each of the one or more log files with the respective unique parameter ID, re-classifying the one or more second sequence files, wherein re-classifying includes determining a classification of error for the one or more second sequence files, and determining a level of similarity between the classification of error for the one or more second sequence files and a plurality of existing trained data. Responsive to a determination that the level of similarity between the classification of error for the one or more second sequence files and the plurality of existing trained data has improved over a level of similarity between a classification of error for the one or more first sequence files and the plurality of existing trained data, the method includes determining, by one or more computer processors, there is an improvement in confidence in the classification of error for the one or more second sequence files. Responsive to a determination that the level of similarity between the classification of error for the one or more second sequence files and the plurality of existing trained data has not improved over a level of similarity between a classification of error for the one or more first sequence files and the plurality of existing trained data, the method includes determining, by one or more computer processors, there is not an improvement in confidence in the classification of error for the one or more second sequence files.

DETAILED DESCRIPTION

Implementation of embodiments of the present invention may take a variety of forms, and exemplary implementation details are discussed subsequently with reference to the Figures.

Figure 1:
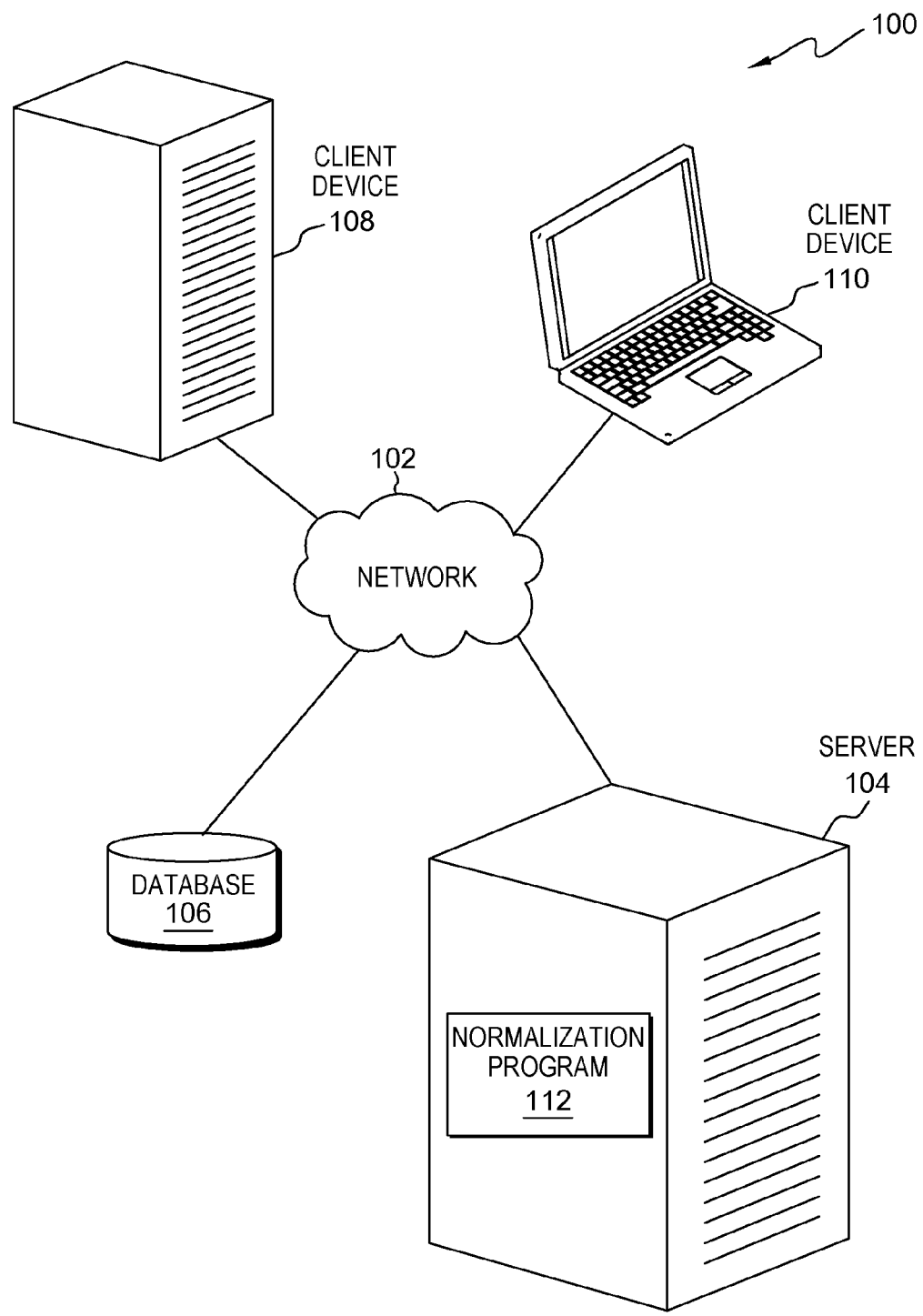
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, database 106, and one or more client devices, such as client device 108 and client device 110.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, database 106, client device 108 and client device 110 are interconnected by network 102. Network 102 can be any combination of connections and protocols capable of supporting communications between server 104, database 106, client device 108, client device 110, and normalization program 112. Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In one embodiment, server 104 may be, for example, a server computer system such as a management server, a web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In the exemplary embodiment, server 104 includes a normalization program 112 for two stage log normalization for automatic noise removal and improved machine learning.

In one embodiment, database 106 is a conventional data storage repository for storing information (i.e., data). In one embodiment, database 106 is capable of storing one or more log files, a plurality of training data for problem diagnosis of the one or more log files, and one or more log file classifications, etc. In another embodiment, database 106 may be a data storage unit, such as a storage server, a redundant array of inexpensive disks (RAID), a hard disk drive, a removable media device (e.g., a compact disc), a random access memory (RAM), a flash memory, a magnetic storage device, or any other suitable data storage unit capable of storing information.

In one embodiment, client device 108 and client device 110 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 108 and client device 110 may be a server computer and a laptop capable of connecting to a network, such as network 102, to conduct problem diagnosis in software systems utilizing a normalization program, such as normalization program 112. In one embodiment, client device 108 and client device 110 may be any suitable type of mobile device capable of running mobile applications, including a smart phone, tablet, slate, or any type of device that runs a mobile operating system. In one embodiment, client device 108 and client device 110 may include a user interface (not shown) for providing an end user with the capability to interact with a normalization program, such as normalization program 112 to diagnosis problems in software systems using normalized log files and conventional machine learning capabilities known in the art. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computer, GUIs were introduced in reaction to the perceived steep learning curve of command-line interfaces, which required commands to be typed on the keyboard. The actions in GUIs are often performed through direct manipulation of the graphics elements.

In one embodiment, normalization program 112 is a software-based component for two stage log normalization for automatic noise removal and improved machine learning processes in problem diagnosis. In one embodiment, normalization program 112 performs a first stage log normalization on one or more log files, extracting message formats without message parameters from the one or more log files without referencing source code or binaries. For example, when performing a first stage normalization on the one or more log files, normalization program 112 calculates a hash of a string, such as "Test machine: %1$s", which is a message format. Normalization program 112 saves each extracted message format into a data store, such as database 106, and determines a unique message ID (i.e., a positive number) for each extracted message format, where the unique message ID may be determined by incrementing, for example, the largest message ID by one. For example, normalization program 112 may save one or more extracted message formats with respective unique message IDs, such as "1 Test machine: %1$s, 2 Starting machine: %1$s at time %2$s, 3 Log into %1$s using username %2$s and password %3$s", in a data store, such as database 106. In one embodiment, normalization program 112 saves a message format to a data store, such as database 106, when the message format does not already exist in the data store. In one embodiment, normalization program 112 generates a sequence of messages without parameters. For example, where a sequence of a log file contains a first message, then a second message, then a third message, then back to the first message, and finally back to the third message, normalization program 112 may generate a sequence of messages "1, 2, 3, 1, 3". In one embodiment, normalization program 112 utilizes a sequence of messages in machine learning processes to classify log files.

In one embodiment, normalization program 112 performs a second stage log normalization on the one or more log files, extracting message parameters from the one or more log files and relates the message parameters to the first stage normalization message formats without referencing source code or binaries. For example, when performing a second stage normalization on the one or more log files, normalization program 112 calculates a hash of a string, such as "10.10.20.200", which is a parameter format. Normalization program 112 saves each extracted parameter format into a data store, such as database 106, and determines a unique parameter ID (i.e., a negative number) for each extracted parameter format, where the unique parameter ID may be determined by decrementing, for example, the smallest parameter ID by one. For example, normalization program 112 may save one or more extracted parameter formats with respective unique parameter IDs, such as "−1 10.10.20.200, −2 1399345022864, −3 root, −4 password", in a data store, such as database 106. In one embodiment, normalization program 112 saves a parameter format to a data store, such as database 106, when the parameter format does not already exist in the data store. In one embodiment, normalization program 112 generates a sequence of parameters that may be added to the end of a log file. For example, where a sequence of a log file contains a first message with a first parameter, then a second message with the first parameter and a second parameter, then a third message with the first parameter, a third parameter, and a fourth parameter, normalization program 112 may generate a sequence "1, −1, 2, −1, −2, 3, −1, −3, −4". In one embodiment, normalization program 112 utilizes a sequence of messages and parameters in machine learning processes to classify log files.

Figure 2:
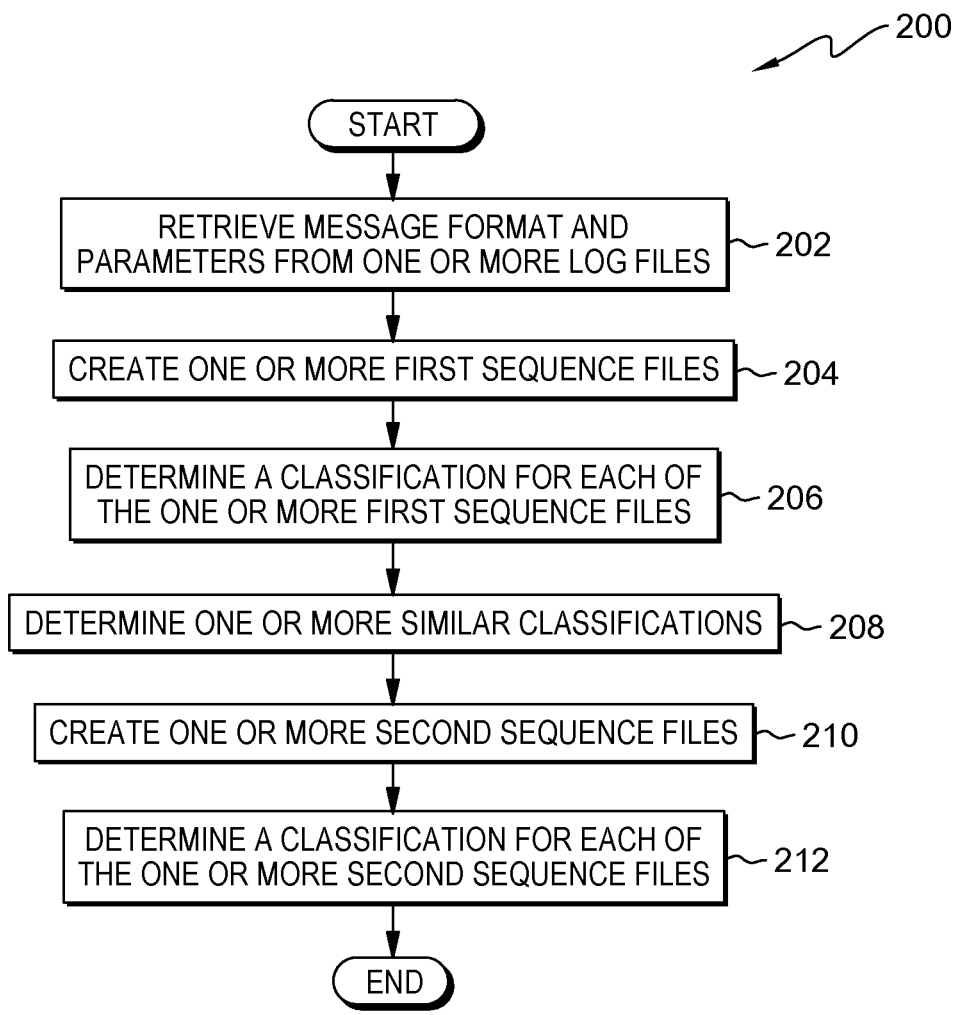
FIG. 2 is a flowchart depicting operational steps of a normalization program (such as the normalization program of FIG. 1) for training a two stage log normalization system, in accordance with an embodiment of the present invention.

FIG. 2 is a flowchart depicting operational steps of a normalization program (such as the normalization program of FIG. 1), generally designated 200, for training a two stage log normalization system, in accordance with an embodiment of the present invention.

Normalization program 112 retrieves a message format and parameters from one or more log files (202). In one embodiment, normalization program 112 retrieves a message format and parameters from the one or more log files by extracting one or more message formats and one or more parameter formats from one or more log files (i.e., entries) using, for example, an extensible markup language (XML) parser, a log data mining tool, reverse look-up of resource files, or any other suitable methods of extracting data from log files.

Normalization program 112 creates one or more first sequence files (204). In one embodiment, normalization program 112 creates one or more first sequence files by retrieving a corresponding unique message ID for each of the one or more log files from, for example, a data store, such as database 106. In one embodiment, normalization program 112 creates a first sequence file containing only a sequence of the unique message ID for each of the one or more log files.

Normalization program 112 determines a classification for each of the one or more first sequence files (206). In one embodiment, normalization program 112 determines a classification for each of the one or more first sequence files by utilizing conventional machine learning processes known in the art, such as a support vector machine, to train the two stage log normalization system. In one embodiment, normalization program 112 saves the classification for each of the one or more first sequence files in a data store, such as database 106, for future reference with respect to, for example, system training and problem diagnosis.

Normalization program 112 determines one or more similar classifications (208). In one embodiment, normalization program 112 determines one or more similar classifications between each of the one or more first sequence files by determining where a pattern of unique message ID's between each of the one or more first sequence files are similar.

Normalization program 112 creates one or more second sequence files (210). In one embodiment, normalization program 112 creates one or more second sequence files by retrieving a corresponding unique parameter ID for each of the one or more log files from a data store, such as database 106. In one embodiment, normalization program 112 creates the one or more second sequence files by sequencing the unique message IDs with their respective unique parameter IDs. In one embodiment, normalization program 112 creates a second sequence file containing a sequence of the unique message IDs and a sequence of the unique parameter IDs for each of the one or more log files.

Normalization program 112 determines a classification for each of the one or more second sequence files (212). In one embodiment, normalization program 112 determines a classification for each of the one or more second sequence files by utilizing conventional machine learning processes known in the art, such as a support vector machine, to further classify the one or more log files based on the unique message IDs and unique parameter IDs (i.e., the one or more second sequence files).

Figure 3:
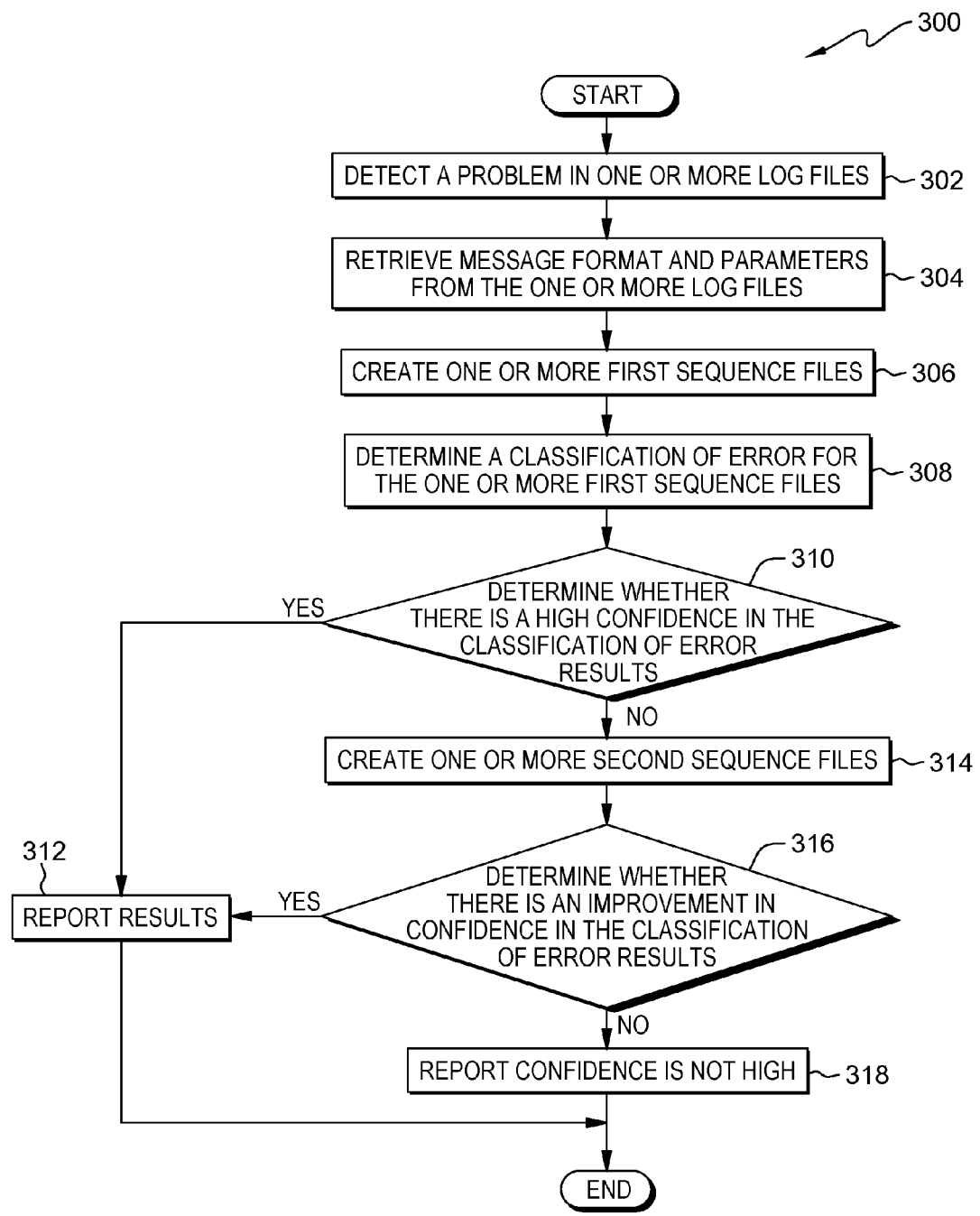
FIG. 3 is a flowchart depicting operational steps of a normalization program (such as the normalization program of FIG. 1) for problem determination utilizing two stage log normalization, in accordance with an embodiment of the present invention.

FIG. 3 is a flowchart depicting operational steps of a normalization program (such as the normalization program of FIG. 1), generally designated 300, for problem determination utilizing two stage log normalization, in accordance with an embodiment of the present invention.

Normalization program 112 detects a problem in one or more log files (302). In one embodiment, normalization program 112 detects a problem in one or more log files by receiving an error notification from a client device, such as client device 108 and client device 110. In another embodiment, normalization program 112 may detect a problem in one or more log files via an error notification from a software system.

Normalization program 112 retrieves message format and parameters from the one or more log files (304). In one embodiment, normalization program 112 retrieves message format and parameters from the one or more log files of a client device, such as client device 108 and client device 110, where the one or more log files are collected and merged based, at least in part, on a time stamp. In one embodiment, normalization program 112 retrieves a message format and parameters from the one or more log files by extracting one or more message formats and one or more parameter formats from one or more log files (i.e., entries) using, for example, an extensible markup language (XML) parser, a log data mining tool, reverse look-up of resource files, or any other suitable methods of extracting data from log files.

Normalization program 112 creates one or more first sequence files (306). In one embodiment, normalization program 112 creates one or more first sequence files by retrieving a corresponding unique message ID for each of the one or more log files from, for example, a data store, such as database 106. In one embodiment, normalization program 112 creates a first sequence file containing only a sequence of the unique message ID for each of the one or more log files.

Normalization program 112 determines a classification of error for each of the one or more first sequence files (308). In one embodiment, normalization program 112 determines a classification of error for each of the one or more first sequence files based, at least in part, on existing trained data stored in a data store, such as database 106. In some embodiments, the existing trained data is generated according to operational steps discussed in reference to FIG. 2. In one embodiment, normalization program 112 determines a classification of error (i.e., a classification of an error condition) by determining similarities between the one or more first sequence files and existing trained data. In some embodiments, normalization program 112 returns classification of error results to a tester or developer that may desire to further examine the one or more log files.

Normalization program 112 determines whether there is a high confidence in the classification of error results (310). In one embodiment, normalization program 112 determines whether there is a high confidence in the classification of error results by determining a level of similarity between the classification of error and the existing trained data. Where normalization program 112 determines that a level of similarity between the classification of error and the existing trained data is high, normalization program 112 determines there is a high confidence in the results (i.e., the results are accurate). For example, normalization program 112 may determine that a level of similarity between the classification of error and the existing trained data is high where the level of similarity is greater than fifty percent, or where the level of similarity exceeds a pre-defined similarity threshold. Where normalization program 112 determines that a level of similarity between the classification of error and the existing trained data is low, normalization program 112 determines there is not a high confidence in the classification of error results (i.e., the results are not accurate). For example, normalization program 112 may determine that a level of similarity between the classification of error and the existing trained data is low where the level of similarity is less than fifty percent, or where the level of similarity fails to exceed a pre-defined similarity threshold.

Responsive to a determination that there is a high confidence in the classification of error results (YES branch, 310), normalization program 112 reports the results (312). In one embodiment, normalization program 112 may report the classification of error results to a tester or developer through a display, a user interface, a print out, a table, or any other suitable means of providing results.

Responsive to a determination that there is not a high confidence in the classification of error results (NO branch, 310), normalization program 112 creates one or more second sequence files (314). In one embodiment, normalization program 112 creates one or more second sequence files by retrieving a corresponding unique parameter ID for each of the one or more log files from a data store, such as database 106. In one embodiment, normalization program 112 creates the one or more second sequence files by sequencing the unique message IDs with their respective unique parameter IDs. In one embodiment, normalization program 112 creates a second sequence file containing a sequence of the unique message IDs and a sequence of the unique parameter IDs for each of the one or more log files.

Normalization program 112 determines whether there is an improvement in confidence in the classification of error results (316). In one embodiment, normalization program 112 determines whether there is an improvement in the confidence in the classification of error results by re-classifying the one or more second sequence files and determining a level of similarity between the classification of error for the one or more second sequence files and the trained data. Where normalization program 112 determines that a level of similarity between the classification of error for the one or more second sequence files and the trained data has improved over the level of similarity between the classification of error for the one or more first sequence files and the trained data, normalization program 112 determines there is an improvement in confidence in the classification of error results (i.e., the results are accurate). Where normalization program 112 determines that a level of similarity between the classification of error for the one or more second sequence files and the trained data has not improved over the level of similarity between the classification of error for the one or more first sequence files, normalization program 112 determines there is not an improvement in confidence in the classification of error results (i.e., the results are not accurate).

Responsive to a determination that there is an improvement in confidence in the classification of error results (YES branch, 316), normalization program 112 reports the results (312).

Responsive to a determination that there is not an improvement in confidence in the classification of error results (NO branch, 316), normalization program 112 reports confidence is not high (318). In one embodiment, normalization program 112 reports confidence is not high by notifying a tester or developer that the classification for error results are inconclusive.

Figure 4:
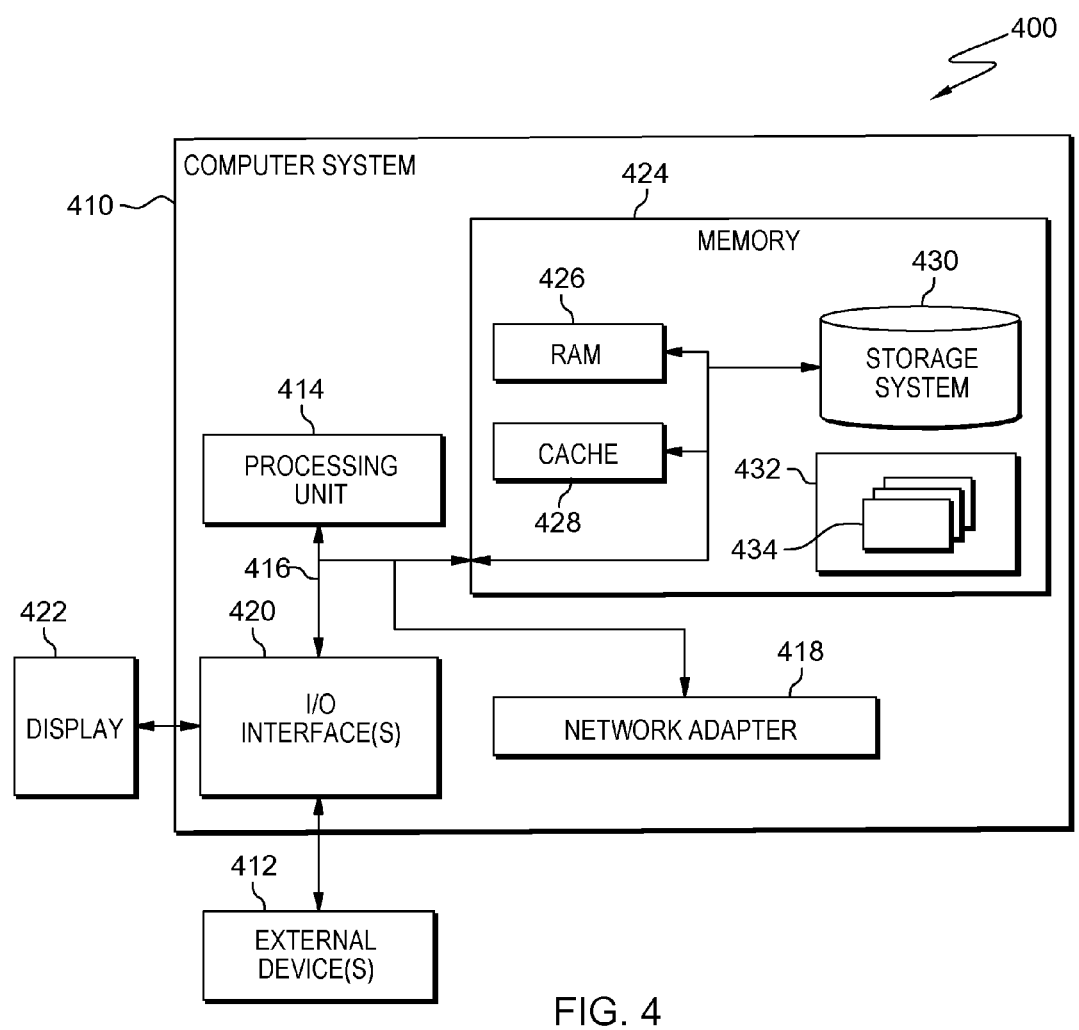
FIG. 4 is a block diagram depicting components of a data processing system (such as the server of FIG. 1), in accordance with an embodiment of the present invention.

FIG. 4 depicts a block diagram of components of a data processing system, such as server 104 of FIG. 1, generally designated 400, in accordance with an illustrative embodiment of the present invention. It should be appreciated that FIG. 4 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 410. The components of computer system 410 may include, but are not limited to, one or more processors or processing unit 414, memory 424, and bus 416 that couples various system components including memory 424 to processing unit(s) 414.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer system readable media. Such media may be any available media that is accessible by computer system 410, and it includes both volatile and non-volatile media, removable and non-removable media.

Memory 424 can include computer system readable media in the form of volatile memory, such as random access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, memory 424 may include at least one computer program product having a set (e.g., at least one) of program modules that are configured to carry out the functions of embodiments of the invention.

Program/utility 432, having one or more sets of program modules 434, may be stored in memory 424 by way of example, and not limitation, as well as an operating system, one or more application programs, other program modules, and program data. Each of the operating systems, one or more application programs, other program modules, and program data, or some combination thereof, may include an implementation of a networking environment. Program modules 434 generally carry out the functions and/or methodologies of embodiments of the invention as described herein. Computer system 410 may also communicate with one or more external device(s) 412, such as a keyboard, a pointing device, a display 422, etc., or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks, such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems may be used in conjunction with computer system 410.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for two stage log normalization, the method comprising:

retrieving, by one or more computer processors, a message format and a plurality of parameters from one or more log files;

determining, by one or more computer processors, a classification for one or more first sequence files, wherein the one or more first sequence files includes the message format from the one or more log files, wherein determining includes creating the one or more first sequence files, wherein creating includes retrieving a corresponding unique message identifier (ID) for each of the one or more log files, and utilizing conventional machine learning processes to train data for the classification of the one or more first sequence files;

determining, by one or more computer processors, a classification of error for the one or more first sequence files by determining one or more similarities between the one or more first sequence files and a plurality of existing trained data;

determining, by one or more computer processors, whether there is a high confidence in the classification of error for the one or more first sequence files by determining a level of similarity between the classification of error for the one or more first sequence files and the plurality of existing trained data;

responsive to a determination that the level of similarity between the classification of error for the one or more first sequence files and the plurality of existing trained data is high, determining, by one or more computer processors, that there is a high confidence in the classification of error;

responsive to a determination that the level of similarity between the classification of error for the one or more first sequence files and the plurality of existing trained data is low, determining, by one or more computer processors, that there is not a high confidence in the classification of error;

responsive to a determination that there is not a high confidence in the classification of error for the one or more first sequence files, determining, by one or more computer processors, whether there is an improvement in confidence in the classification of error from one or more second sequence files, wherein the one or more second sequence files includes the message format and the plurality of parameters from the one or more log files, wherein determining the improvement includes creating the one or more second sequence files, wherein creating includes retrieving a corresponding unique parameter ID for each of the one or more log files and sequencing the unique message ID for each of the one or more log files with the respective unique parameter ID, re-classifying the one or more second sequence files, wherein re-classifying includes determining a classification of error for the one or more second sequence files, and determining a level of similarity between the classification of error for the one or more second sequence files and the plurality of existing trained data;

responsive to a determination that the level of similarity between the classification of error for the one or more second sequence files and the plurality of existing trained data has improved over a level of similarity between a classification of error for the one or more first sequence files and the plurality of existing trained data, determining, by one or more computer processors, there is an improvement in confidence in the classification of error for the one or more second sequence files; and responsive to a determination that the level of similarity between the classification of error for the one or more second sequence files and the plurality of existing trained data has not improved over a level of similarity between a classification of error for the one or more first sequence files and the plurality of existing trained data, determining, by one or more computer processors, there is not an improvement in confidence in the classification of error for the one or more second sequence files.

* * * * *